United States Patent
LaPlante

(10) Patent No.: US 9,794,353 B2
(45) Date of Patent: Oct. 17, 2017

(54) SYSTEMS, METHODS, AND COMPUTER PROGRAM PRODUCTS FOR SERVICE PROCESSING

(71) Applicant: GOOGLE INC., Mountain View, CA (US)

(72) Inventor: Lance C. LaPlante, Irving, TX (US)

(73) Assignee: GOOGLE INC., Mountain View, CA (US)

(*) Notice: Subject to any disclaimer, the term of this patent is extended or adjusted under 35 U.S.C. 154(b) by 296 days.

(21) Appl. No.: 14/570,371

(22) Filed: Dec. 15, 2014

(65) Prior Publication Data

US 2015/0180702 A1    Jun. 25, 2015

Related U.S. Application Data

(60) Provisional application No. 61/918,210, filed on Dec. 19, 2013, provisional application No. 61/918,216, filed on Dec. 19, 2013.

(51) Int. Cl.
  *H04L 29/08*   (2006.01)
  *H04L 12/26*   (2006.01)
  *H04L 12/24*   (2006.01)

(52) U.S. Cl.
  CPC .......... *H04L 67/16* (2013.01); *H04L 41/5012* (2013.01); *H04L 41/5041* (2013.01); *H04L 43/0805* (2013.01); *H04L 43/0817* (2013.01)

(58) Field of Classification Search
  CPC ............. H04L 41/5012; H04L 41/5041; H04L 43/0805; H04L 43/0817; H04L 67/16
  See application file for complete search history.

(56) References Cited

U.S. PATENT DOCUMENTS

| 5,590,038 A | 12/1996 | Pitroda | 395/241 |
| 5,640,002 A | 6/1997 | Ruppert et al. | 235/472 |

(Continued)

FOREIGN PATENT DOCUMENTS

| CA | 2 381 614 A1 | 3/2001 |
| EP | 1 222 503 A2 | 7/2002 |

(Continued)

OTHER PUBLICATIONS

Kim, "International Search Report and Written Opinion issued in International Application No. PCT/US2014/070317", mailed on Feb. 27, 2015, 9 pages.

(Continued)

*Primary Examiner* — Joe Chacko
(74) *Attorney, Agent, or Firm* — Johnson, Marcou & Isaacs, LLC

(57) ABSTRACT

A system for managing process requests includes at least one memory operable to store request and response queues and a processor coupled to the memory. A request to execute a process is received and stored in a request queue among a set of request queues, the request queue corresponding to the process. It is determined if one or more nodes on a network are available to perform the process. An expiration value for the request is set based on a type of the process. The request is dispatched to the one or more nodes on the network to perform the process at a predetermined timing. A response is received from the one or more nodes. The response is stored in a response queue among a set of response queues, the response queue corresponding to the process. The response is dispatched from the response queue.

17 Claims, 6 Drawing Sheets

(56) References Cited

U.S. PATENT DOCUMENTS

| | | | | |
|---|---|---|---|---|
| 5,748,740 | A | 5/1998 | Curry et al. | 380/25 |
| 5,805,702 | A | 9/1998 | Curry et al. | 380/24 |
| 5,872,929 | A * | 2/1999 | Naito | H04L 12/2602 |
| | | | | 709/223 |
| 5,884,271 | A | 3/1999 | Pitroda | 705/1 |
| 5,901,303 | A | 5/1999 | Chew | 395/400 |
| 5,940,510 | A | 8/1999 | Curry et al. | 380/25 |
| 5,949,880 | A | 9/1999 | Curry et al. | 380/24 |
| 5,949,977 | A * | 9/1999 | Hernandez | G06F 9/5044 |
| | | | | 709/203 |
| 6,073,840 | A | 6/2000 | Marion | 235/381 |
| 6,105,013 | A | 8/2000 | Curry et al. | 705/65 |
| 6,116,505 | A | 9/2000 | Withrow | 235/381 |
| 6,131,811 | A | 10/2000 | Gangi | 235/380 |
| 6,237,095 | B1 | 5/2001 | Curry et al. | 713/178 |
| 6,422,464 | B1 | 7/2002 | Terranova | 235/384 |
| 6,587,835 | B1 | 7/2003 | Treyz et al. | 705/14 |
| 6,601,759 | B2 | 8/2003 | Fife et al. | 235/375 |
| 6,671,358 | B1 | 12/2003 | Sossaman et al. | 379/93.12 |
| 6,732,081 | B2 | 5/2004 | Nicholson | 705/14 |
| 6,769,607 | B1 | 8/2004 | Pitroda et al. | 235/380 |
| 6,813,609 | B2 | 11/2004 | Wilson | 705/14 |
| 6,837,436 | B2 | 1/2005 | Swartz et al. | 235/472.02 |
| 6,925,439 | B1 | 8/2005 | Pitroda | 705/1 |
| 7,083,094 | B2 | 8/2006 | Cooper | 235/449 |
| 7,110,792 | B2 | 9/2006 | Rosenberg | 455/558 |
| 7,127,236 | B2 | 10/2006 | Khan et al. | 455/414.1 |
| 7,155,405 | B2 | 12/2006 | Petrovich | 705/26 |
| 7,194,422 | B1 | 3/2007 | Killick | 705/14 |
| 7,216,109 | B1 | 5/2007 | Donner | 705/64 |
| 7,249,112 | B2 | 7/2007 | Berardi et al. | 705/79 |
| 7,286,818 | B2 | 10/2007 | Rosenberg | 455/414.1 |
| 7,298,271 | B2 | 11/2007 | Sprogis | 340/572.1 |
| 7,308,426 | B1 | 12/2007 | Pitroda | 705/35 |
| 7,330,714 | B2 | 2/2008 | Rosenberg | 455/412.1 |
| 7,349,885 | B2 | 3/2008 | Gangi | 705/41 |
| 7,469,151 | B2 | 12/2008 | Khan et al. | 455/558 |
| 7,469,381 | B2 | 12/2008 | Ording | 715/702 |
| 7,483,858 | B2 | 1/2009 | Foran et al. | 705/39 |
| 7,494,055 | B2 | 2/2009 | Fernandes et al. | 235/380 |
| 7,529,563 | B1 | 5/2009 | Pitroda | 455/558 |
| 7,571,139 | B1 | 8/2009 | Giordano et al. | 705/40 |
| 7,581,678 | B2 | 9/2009 | Narendra et al. | 235/451 |
| 7,613,628 | B2 | 11/2009 | Ariff et al. | 705/14 |
| 7,631,810 | B2 | 12/2009 | Liu et al. | 235/451 |
| 7,693,752 | B2 | 4/2010 | Jaramillo | 705/26 |
| 7,708,198 | B2 | 5/2010 | Gangi | 235/380 |
| 7,712,658 | B2 | 5/2010 | Gangi | 235/380 |
| 7,775,430 | B2 | 8/2010 | Lin | 235/383 |
| 7,805,615 | B2 | 9/2010 | Narendra et al. | 713/186 |
| 7,828,214 | B2 | 11/2010 | Narendra et al. | 235/451 |
| 7,856,377 | B2 | 12/2010 | Cohagan et al. | 705/14.3 |
| 7,864,163 | B2 | 1/2011 | Ording et al. | 345/173 |
| 7,912,971 | B1 * | 3/2011 | Dunn | H04L 63/102 |
| | | | | 709/203 |
| 7,942,337 | B2 | 5/2011 | Jain | 235/492 |
| 7,954,715 | B2 | 6/2011 | Narendra et al. | 235/451 |
| 7,954,716 | B2 | 6/2011 | Narendra et al. | 235/451 |
| 7,954,717 | B2 | 6/2011 | Narendra et al. | 235/451 |
| 7,961,101 | B2 | 6/2011 | Narendra et al. | 340/572.1 |
| 7,967,215 | B2 | 6/2011 | Kumar et al. | 235/492 |
| 7,991,158 | B2 | 8/2011 | Narendra et al. | 380/260 |
| 8,072,331 | B2 | 12/2011 | Narendra et al. | 340/572.1 |
| 8,083,145 | B2 | 12/2011 | Narendra et al. | 235/451 |
| 8,091,786 | B2 | 1/2012 | Narendra et al. | 235/451 |
| 8,131,645 | B2 | 3/2012 | Lin et al. | 705/51 |
| 8,140,418 | B1 | 3/2012 | Casey et al. | 705/35 |
| 8,196,142 | B2 | 6/2012 | Rattner et al. | |
| 8,396,808 | B2 | 3/2013 | Greenspan | 705/64 |
| 8,429,046 | B2 | 4/2013 | Pitroda | 705/35 |
| 8,447,894 | B2 * | 5/2013 | Chen | G06F 3/0607 |
| | | | | 710/17 |
| 2002/0049631 | A1 | 4/2002 | Williams | 705/14 |
| 2002/0082921 | A1 | 6/2002 | Rankin | 705/14 |
| 2002/0174025 | A1 | 11/2002 | Hind et al. | 705/26 |
| 2002/0179703 | A1 | 12/2002 | Allen | 235/381 |
| 2003/0009382 | A1 | 1/2003 | D'Arbeloff et al. | 705/17 |
| 2003/0083042 | A1 | 5/2003 | Abuhamdeh | 455/406 |
| 2003/0115126 | A1 | 6/2003 | Pitroda | 705/36 |
| 2003/0132298 | A1 | 7/2003 | Swartz et al. | 235/472.02 |
| 2003/0135613 | A1 * | 7/2003 | Yoshida | H04L 12/2602 |
| | | | | 709/224 |
| 2003/0149735 | A1 | 8/2003 | Stark et al. | |
| 2003/0200489 | A1 | 10/2003 | Hars | 714/703 |
| 2004/0073519 | A1 | 4/2004 | Fast | 705/65 |
| 2004/0186768 | A1 | 9/2004 | Wakim et al. | 705/14 |
| 2005/0004866 | A1 | 1/2005 | Bonalle et al. | 705/39 |
| 2005/0102393 | A1 * | 5/2005 | Murray | H04L 29/06 |
| | | | | 709/224 |
| 2005/0171898 | A1 | 8/2005 | Bishop et al. | 705/39 |
| 2005/0222961 | A1 | 10/2005 | Staib et al. | 705/64 |
| 2005/0234769 | A1 | 10/2005 | Jain et al. | 705/14 |
| 2005/0247777 | A1 | 11/2005 | Pitroda | 235/380 |
| 2006/0287004 | A1 | 12/2006 | Fuqua | 455/558 |
| 2007/0014407 | A1 | 1/2007 | Narendra et al. | 380/259 |
| 2007/0014408 | A1 | 1/2007 | Narendra et al. | 380/270 |
| 2007/0198432 | A1 | 8/2007 | Pitroda et al. | 705/64 |
| 2008/0034111 | A1 * | 2/2008 | Kamath | H04L 67/1008 |
| | | | | 709/238 |
| 2008/0040265 | A1 * | 2/2008 | Rackley III | G06Q 20/02 |
| | | | | 705/40 |
| 2008/0306849 | A1 | 12/2008 | Johnson, Jr. et al. | 705/35 |
| 2009/0055810 | A1 | 2/2009 | Kondur | |
| 2009/0108064 | A1 | 4/2009 | Fernandes et al. | 235/380 |
| 2009/0164322 | A1 | 6/2009 | Khan et al. | 705/14 |
| 2009/0164571 | A1 * | 6/2009 | Potter | H04L 67/10 |
| | | | | 709/203 |
| 2009/0187654 | A1 * | 7/2009 | Raja | H04L 63/0272 |
| | | | | 709/224 |
| 2010/0067402 | A1 | 3/2010 | Navarro et al. | |
| 2010/0241494 | A1 | 9/2010 | Kumar et al. | 705/14.1 |
| 2011/0073663 | A1 | 3/2011 | Narendra et al. | 235/492 |
| 2011/0093591 | A1 | 4/2011 | Dalal et al. | |
| 2011/0171996 | A1 | 7/2011 | Narendra et al. | 455/558 |
| 2011/0223972 | A1 | 9/2011 | Narendra et al. | 455/558 |
| 2011/0231238 | A1 | 9/2011 | Khan et al. | 705/14.26 |
| 2011/0244796 | A1 | 10/2011 | Khan et al. | 455/41.1 |
| 2011/0269438 | A1 | 11/2011 | Narendra et al. | 455/414.1 |
| 2011/0271044 | A1 | 11/2011 | Narendra et al. | 711/103 |
| 2011/0272468 | A1 | 11/2011 | Narendra et al. | 235/492 |
| 2011/0272469 | A1 | 11/2011 | Narendra et al. | 235/492 |
| 2011/0276974 | A1 * | 11/2011 | Chung | G06F 13/1689 |
| | | | | 718/103 |
| 2012/0064828 | A1 | 3/2012 | Khan et al. | 455/41.1 |
| 2012/0102183 | A1 * | 4/2012 | Murakami | G06F 9/5072 |
| | | | | 709/224 |
| 2012/0109764 | A1 | 5/2012 | Martin et al. | 705/17 |
| 2012/0284390 | A1 | 11/2012 | Chokkalingam et al. | |
| 2012/0323664 | A1 | 12/2012 | Klems | 705/14.26 |
| 2013/0005325 | A1 | 1/2013 | Schrader et al. | |
| 2013/0013723 | A1 | 1/2013 | Deshmukh et al. | |
| 2013/0151773 | A1 * | 6/2013 | Vandiver | G06F 3/0617 |
| | | | | 711/118 |
| 2013/0238903 | A1 * | 9/2013 | Mizunuma | G06F 21/31 |
| | | | | 713/176 |
| 2013/0305085 | A1 | 11/2013 | Ocko et al. | |
| 2015/0180750 | A1 | 6/2015 | Laplante et al. | |
| 2015/0302398 | A1 | 10/2015 | Desai et al. | |

FOREIGN PATENT DOCUMENTS

| | | |
|---|---|---|
| EP | 0 766 852 B1 | 8/2004 |
| EP | 1 412 890 A4 | 11/2004 |
| EP | 1 477 943 A2 | 11/2004 |
| WO | WO 01/18629 A3 | 3/2001 |
| WO | WO 03/012717 A1 | 2/2003 |
| WO | 03/094019 A1 | 11/2003 |
| WO | 2015/095030 A1 | 6/2015 |
| WO | 2015/095033 A1 | 6/2015 |

(56) References Cited

OTHER PUBLICATIONS

Kim, "International Search Report and Written Opinion issued in International Application No. PCT/US2014/070320", mailed on Feb. 27, 2015, 10 pages.
Moussaid, "International Preliminary Report on Patentability issued in International Application No. PCT/US2014/070317", mailed on Jun. 30, 2016, 6 pages.
Moussaid, "International Preliminary Report on Patentability issued in International Application No. PCT/US2014/070320", mailed on Jun. 30, 2016, 7 pages.
Wang, "U.S. Office Action issued in copending U.S. Appl. No. 14/570,361, filed Dec. 15, 2014", mailed on Aug. 8, 2016, 17 pages.
U.S. Appl. No. 14/570,361 to LaPlante et al. filed Dec. 15, 2014.
Fantacone, "Extended European Search Report issued in European Application No. 14870857.1", dated Jul. 13, 2017, 9 pages.
Fantacone, "Extended European Search Report issued in European Application No. 14872946.0", dated Jul. 18, 2017, 8 pages.
Santhosh, et al., "Pre-emptive Scheduling of Nn-line Real Time Services with Task Migration for Cloud Computing", Pattern Recognition, Informatics and Medical Engineering (PRIME), International Conference on IEEE, Feb. 21, 2013, 6 pages.

\* cited by examiner

SYSTEMS, METHODS, AND COMPUTER PROGRAM PRODUCTS FOR SERVICE PROCESSING

CROSS REFERENCE TO RELATED APPLICATIONS

This application claims priority to U.S. Provisional Application Nos. 61/918,210 and 61/918,216, filed Dec. 19, 2013, the contents of which are incorporated herein by reference.

BACKGROUND

Field

The present invention relates to service processing, and more particularly to systems, methods, and computer program products for managing service requests in accordance with the availability of services, processes, and components.

Related Art

In the field of service processing on a network, it is common to execute services (and/or processes which comprise the services) by utilizing multiple different nodes (e.g. systems or entities) on the network. For example, in a mobile commerce environment, one system might be responsible for managing security in communications, whereas another system might be responsible for generating content such as offers. By using multiple nodes across the network, each providing different services, it is ordinarily possible to provide a robust set of services across the network.

Nevertheless, due to planned or unplanned circumstances, service interruptions may occur on the network. For example, a node on the network may become unavailable for a period of time due to a planned outage or a malfunction. As such, any services associated with (e.g., performed or executed by) the node will also become unavailable.

Accordingly, one technical challenge involves maintaining reliable processing in the event of a service interruption. In particular, rather than immediately rejecting every service request (or treating the request as a failure), it is desirable to at least attempt to wait for some period of time to see if the service can be provided. At the same time, there is a need to control processing of requests so that the system is not overwhelmed during or following such service interruptions.

Moreover, conventional systems may simply indicate that a node is off or on, without considering the consequences of the unavailability of the node. Thus, another technical challenge involves providing a more robust consideration of the context of "unavailability" on a network.

BRIEF DESCRIPTION

The example embodiments presented herein address the above-identified needs by providing systems, methods, and computer program products for responding to service requests in accordance with service and/or system availability.

In one example embodiment, a system for managing process requests, includes at least one memory operable to store request and response queues; and a processor coupled to the memory. A request to execute a process is received. The request is stored in a request queue among a set of request queues, the request queue corresponding to the process. It is determined if one or more nodes on a network are available to perform the process. An expiration value for the request is set based on a type of the process, in a case that the one or more nodes on the network are not available to perform the process. The request is dispatched to the one or more nodes on the network to perform the process at a predetermined timing, in a case that the one or more nodes on the network are available to perform the process. A response is received from the one or more nodes. The response is stored in a response queue among a set of response queues, the response queue corresponding to the process. The response is dispatched from the response queue.

In yet another example embodiment, a method for managing process requests, includes: storing request and response queues; receiving a request to execute a process; storing the request in a request queue among a set of request queues, wherein the request queue corresponds to the process; determining if one or more nodes on a network are available to perform the process; setting an expiration value for the request based on a type of the process, in a case that the one or more nodes on the network are not available to perform the process; dispatching the request to the one or more nodes on the network to perform the process at a predetermined timing, in a case that the one or more nodes on the network are available to perform the process; receiving a response from the one or more nodes; store the response in a response queue among a set of response queues, wherein the response queue corresponds to the process; and, dispatching the response from the response queue.

In still another example embodiment, a non-transitory computer readable storage medium has stored thereon instructions which, when executed by a system including at least one processor and at least one memory, cause the system to perform the steps of: storing request and response queues; receiving a request to execute a process; storing the request in a request queue among a set of request queues, wherein the request queue corresponds to the process; determining if one or more nodes on a network are available to perform the process; setting an expiration value for the request based on a type of the process, in a case that the one or more nodes on the network are not available to perform the process; dispatching the request to the one or more nodes on the network to perform the process at a predetermined timing, in a case that the one or more nodes on the network are available to perform the process; receiving a response from the one or more nodes; store the response in a response queue among a set of response queues, wherein the response queue corresponds to the process; and, dispatching the response from the response queue.

BRIEF DESCRIPTION OF THE DRAWINGS

The features and advantages of the present invention will become more apparent from the detailed description set forth below when taken in conjunction with the following drawings.

DETAILED DESCRIPTION

The example embodiments presented herein are directed to systems, methods, and computer program products for queuing and responding to service requests in accordance with service and/or system availability, which are described herein in terms of an example mobile commerce environment. This description is not intended to limit the application of the example embodiments presented herein. In fact, after reading the following description, it will be apparent to one skilled in the relevant art(s) how to implement the following example embodiments in alternative embodiments, such as a web-services or web media-based environment, etc.

According to embodiments described herein, incoming requests for a process (or a service comprising a set of processes) are queued, and a determination is made as to whether one or more nodes on the network are available to perform the requested process. The determination is based on detecting an unavailable node, and determining services performed by the unavailable node or which depend on the unavailable node. In a case which the one or more nodes are available to perform the requested process, the request is dispatched from the queue. On the other hand, if one or more nodes are not available to perform the requested process, an expiration value for the request is set based on the type of process.

The features discussed above are described in further detail below, with reference to FIGS. 1-6.

The terms "wallet client", "mobile wallet application", "mobile wallet" and/or the plural forms of these terms are used interchangeably herein to refer to a mobile wallet application deployed, stored and/or functioning on a mobile device.

As used herein, a "service" is a set or subset of code, which when executed by one or more processors (e.g., in a mobile device, server, or the like) causes the processor(s) to perform specific tasks. A service may comprise one or more processes. For example, a wallet client application may include several services, such as "Activate Wallet" and "Personalize Wallet", each of which may be made up of one or more processes.

As used herein, a "process" is a set of instructions which is executed to perform a function required by a service. For example, one or more processes may comprise the steps required by a service, or may comprise individual functions which are offered as part of a service. In some instances, a client may request a process separately from the service with which it is associated.

As used herein, a "node" on a network is a system, computer, mobile device or other entity connected to a network.

As used herein, a "request" may also be referred to as a "message" or a "request/message" as according to certain embodiments, the request is processed in the format of a message.

Figure 1:
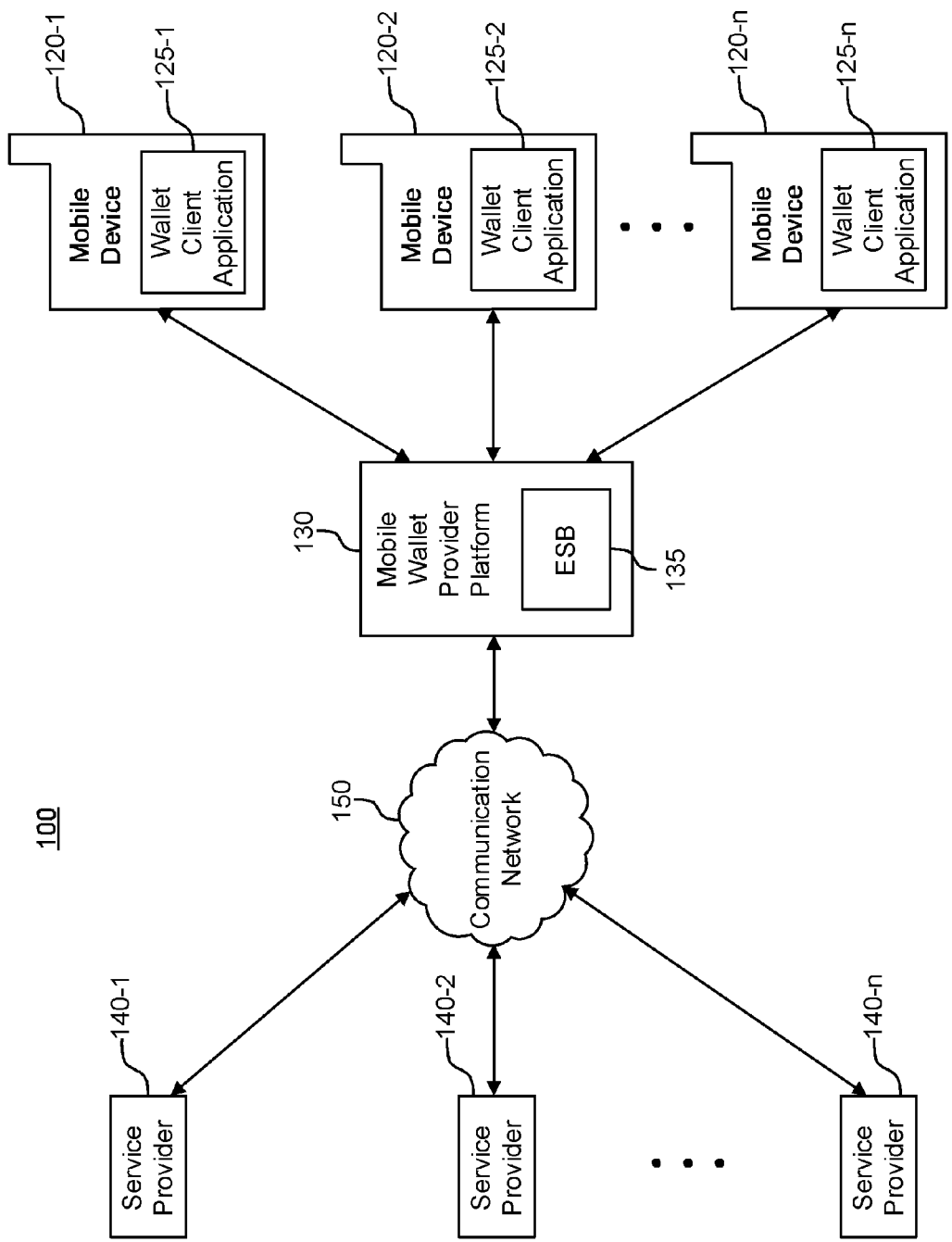
FIG. 1 is a diagram of a mobile commerce system for queuing and responding to service requests in accordance with service availability according to an exemplary embodiment.

FIG. 1 is a diagram of a system 100 for providing availability of resources according to an exemplary embodiment. As shown in FIG. 1, system 100 includes mobile devices 120-1, 120-2, . . . , 120-n (collectively "120" or "mobile devices 120"); a mobile wallet provider platform 130 including an enterprise service bus (ESB) 135; service providers 140-1, 140-2, . . . , 140-n (collectively "140" or "service providers 140"); and communication network 150.

Mobile devices 120 may be, for example, a cellular phone, tablet or the like. Each of mobile devices 120-1, 120-2, . . . , 120-n includes a processor, memory, and an output display such as a display screen. A secure element (SE) may be included in each mobile device, and may be implemented as a Universal Integrated Circuit Card (UICC), embedded SE card, secure micro secure digital (microSD) card, and the like. A secure element may also be implemented outside of the mobile device with which it is associated. For example, a secure element may be implemented in a cloud-based, remote or virtual storage, and the like.

Mobile devices 120-1, 120-2, . . . , 120-n include or have stored thereon a wallet client application 125-1, 125-2, . . . , 125-n (collectively "125" or "wallet client applications 125"), which include instructions that when executed by the processor of the corresponding mobile device 120, cause the mobile device to act as an instrument, for example, for processing contactless transactions.

Offers used during a transaction may be stored and managed by the Mobile Wallet Provider Platform 130. Mobile Wallet Provider Platform 130 may be a standalone platform, or may be part of a mobile wallet system and/or architecture. The mobile wallet system and/or architecture may include various systems such as ESB 135.

ESB 135 manages interactions between service provider systems and mobile devices, and grants the service provider systems the ability to efficiently and securely communicate with the mobile devices in order to, for example, set up (e.g., install) a service account or transmit a message, without the need for service providers to directly communicate with each mobile device. In an example embodiment, the ESB 135 is hardware and/or software that is implemented to serve as an intermediary between service providers 140-1, 140-2, . . . , 140-n (collectively "140") and mobile devices 120. ESB 101 is communicatively coupled to service providers 140 via a communications network 150.

Mobile Wallet Provider Platform 130 is communicatively coupled to service providers 140 over a communication network 150. A service provider such as service provider 140-1 is a system, platform, computer architecture or the like, managed by a partner and/or merchant (e.g., business, retailer, bank). In one example, a service provider may provide offers to mobile devices 120.

Figure 2:
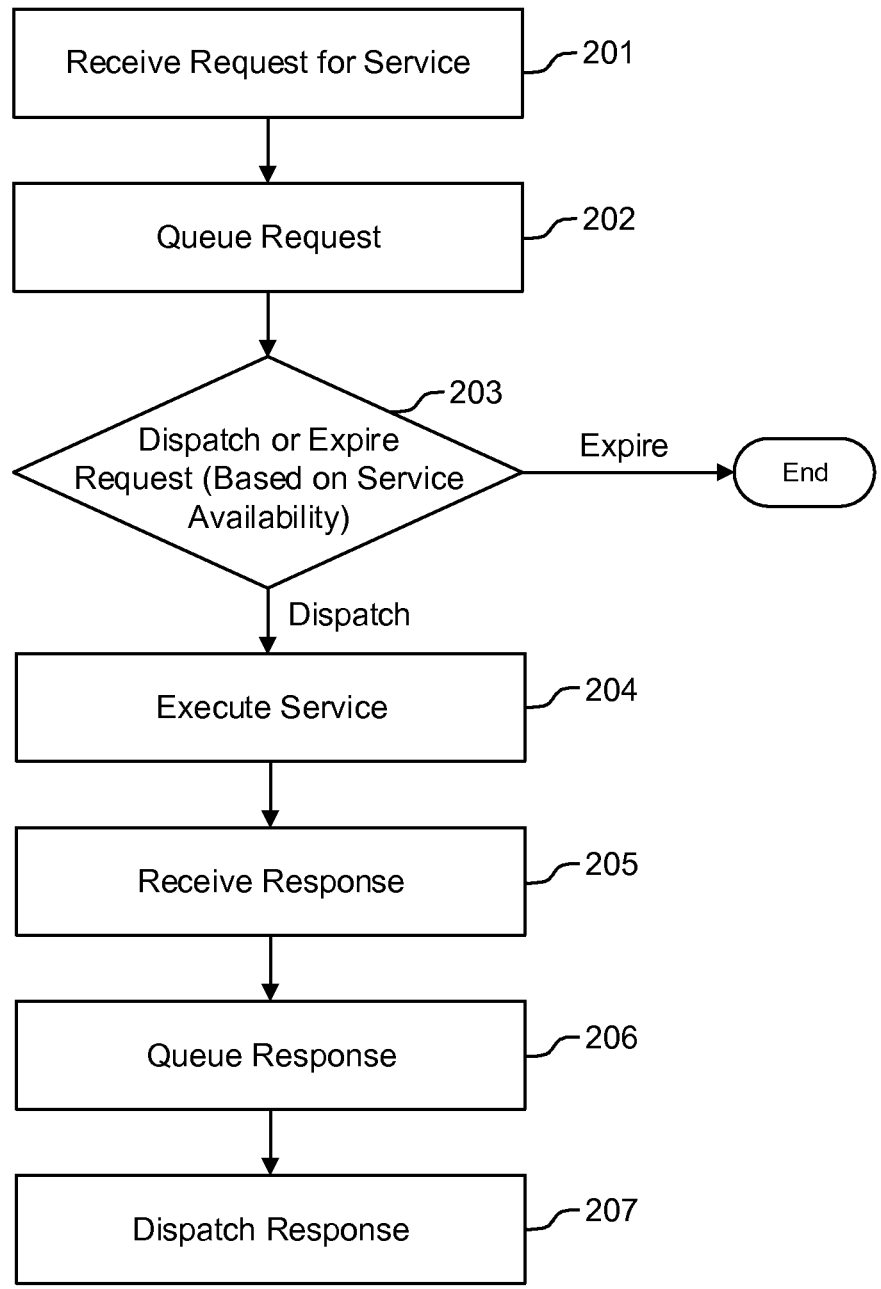
FIG. 2 is a flowchart illustrating the steps for queuing and responding to service requests in accordance with service availability according to an exemplary embodiment.

FIG. 2 is a flowchart illustrating the steps for queuing and responding to service requests in accordance with service availability according to an exemplary embodiment. In that regard, while FIG. 2 generally concerns service requests for a specific service, it should be understood that a request may also be for a specific process or process(es) which are associated with one or more services.

In step 201, a request is received to perform or execute a service and/or a process associated with the service. In particular, a client (e.g., mobile device 120-1) requests a service via ESB 135. For example, the client may submit a request to activate wallet client application 125-1.

In step 202, the request is queued along with other requests for that client. As described more fully below, by storing requests in a queue, it is ordinarily possible to provide flow control by holding the requests and processing the requests when appropriate, or by allowing them to expire if the requested service is not available after a predetermined period of time.

In step 203, a determination is made as to whether to expire or dispatch the request, based on the availability of the requested service. In particular, by communication with nodes (e.g., systems, entities and the like) on the network, the availability or unavailability of a node on the network can be detected, and one or more unavailable services can be determined based on the unavailability of the node. Moreover, because of the dependencies between certain services, the one or more unavailable services may be any services performed by the unavailable node and any services performed by other nodes which depend on the unavailable node. As described more fully below with respect to FIG. 5, the communication with each node may be a "health check" communication which determines whether the node itself is available or unavailable, or a service monitor communication which provides more specific information regarding available services or processes. If the requested service is unavailable for a predetermined period of time, it may be determined to expire the request, notify the user, and end the process. On the other hand, if the service is available, then the request is dispatched to a proxy service, which invokes the requested process(es).

In turn, in step 204, the service is executed by invoking and/or executing the one or more requested processes, and a response is generated by the processes.

In step 205, the response is received from the processes, and the response is placed into a response queue in step 206. As with the request queue, the response queue allows for more fine-tuned flow control of storing and forwarding responses.

In step 207, the response is dispatched to the requesting client.

Figure 3:
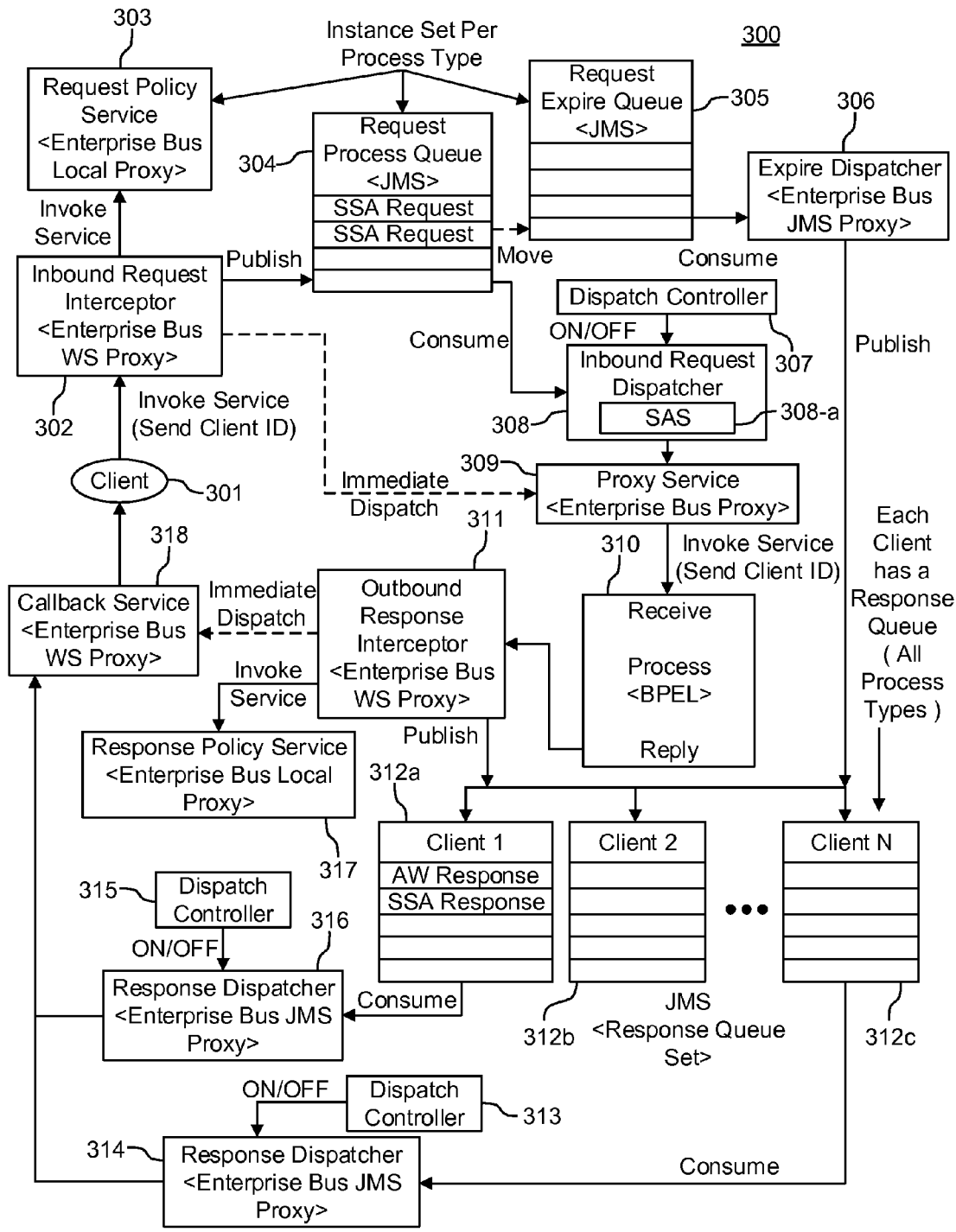
FIG. 3 is a diagram illustrating a framework for queuing and responding to service requests according to an example embodiment.

FIG. 3 is a view for explaining a framework 300 for queuing and responding to service and process requests according to an example embodiment. In one embodiment, this framework is implemented in ESB 135 shown in FIG. 1.

Briefly, as shown in FIG. 3, request and response queues are used to store requests from a client 301 and responses thereto. A request is received for a process (or a service comprising a set of processes), and the request is stored in a request queue. Respective request queues exist for each type of service and/or process.

A determination is made as to whether one or more nodes on a network are available to perform the requested service and/or process. In one example embodiment, this determination is based upon a service availability service 308-*a* in inbound request dispatcher 308. In particular, service availability service 308-*a* stores information regarding the availability of services on a network, detects an unavailability of a node on the network, and determines one or more unavailable services based on the unavailability of the node. The one or more unavailable services are any services performed by the unavailable node and any services performed by other nodes which depend on the unavailable node. A node may be unavailable because, e.g., it is in an OFF state, or may be unavailable even in an ON state when it does not have the capacity to handle one or more incoming request(s) (e.g., because it is over a capacity limit). Such a determination may occur during dispatch processing using service availability service 308-*a*.

In a case which the one or more nodes on the network are not available to perform the requested process, an expiration time for the request is set based on the type of the requested process. On the other hand, in a case which the one or more nodes on the network are available to perform the requested process, the request is dispatched to the one or more nodes on the network to perform the requested process at a predetermined timing. A response is received from the one or more nodes and the response is stored in a response queue. The response is dispatched from the response queue.

Returning to FIG. 3, client 301 may correspond to a wallet client application (e.g. wallet client application 125-1) residing on mobile device (e.g., mobile device 120-1), or another client application.

Inbound request interceptor 302 is hardware and/or software implementing a Web Services Description Language (WSDL) interface and accepts a process/service request from the client 301. Thus, client 301 may request a service, or a specific process. Inbound request interceptor 302 communicates a request to request policy service 303 to determine the request expiration value and destination process request queue. Inbound request interceptor 302 transforms the request to a Java Message Service (JMS) message, sets an expiration value (by invoking request policy service 303) and client ID on the message, and publishes the process request/message to the request process queue 304. That is, inbound request interceptor 302 modifies the request with the expiration value and client ID. As shown in FIG. 3, in some cases a policy configuration (e.g. in request policy service 303) may dictate that a request is immediately dispatched from inbound request interceptor 302 to proxy service 309, bypassing the queue(s).

Request policy service 303 is hardware and/or software providing a service interface and implementation for determining a request expiration value for a given client and type of process/service. Given a request containing the process type and client ID, request policy service 303 returns the request expiration value and destination process request queue. The request expiration value defines the time to hold the request in a scenario where the process is not available. Thus, the expiration value indicates, e.g., how long requests for that type of process will be queued following an unavailability of a node used for that type of process. Different expiration values can be associated with different clients. In one example embodiment, a client (e.g., client 301) might input queuing and expiration parameters such as the expiration value during, e.g., set-up or activation of a service, process, or node. In one example, request policy service 303 may store policies in a table including, for each client ID, an expiration value (e.g., 30 minutes), a service status (e.g., ON or OFF, if such information has been acquired previously), and a queue status (e.g., ON or OFF). As mentioned above, request policy service 303 may also dictate that certain requests are immediately dispatched to proxy service 309, bypassing the queue(s). For example, request policy service 303 may be configured to immediately dispatch a request when the corresponding queue for that type of request is OFF.

Request process queue 304 is e.g., a hardware and/or software JMS queue or other queue resource which provides persistent storage of the process/service request/message. Each type of process may have a dedicated request process queue 304, or multiple clients may share a common request process queue 304 for a given process type. The request process queue 304 is responsible for moving expired messages to request expire queue 305.

Request expire queue 305 is another hardware and/or software queue, e.g., a JMS queue or other queue resource, which provides persistent storage of the process request/messages that have expired. Each request process queue 304 has its own request expire queue 305.

Expire dispatcher 306 is hardware and/or software responsible for consuming and processing expired process requests/messages. In particular, expire dispatcher 306 is responsible for creating an appropriate response (with expired message) for the request and routing the response to the appropriate queue in a response queue set 312*a*, 312*b* . . . 312*c* (hereafter "response queue set 312"). In one example embodiment, routing is based on the client ID that is associated with the expired process request/message. Although not shown, there may be an expire dispatcher 306 (specific to the process type) associated with each request expire queue 305.

Dispatch controller 307 is hardware and/or software responsible for managing the activity state and the flow rate of consumption/processing of a message dispatcher, e.g., inbound request dispatcher 308. In particular, dispatch controller 307 may provide activity state management, e.g., configuring inbound request dispatcher 308 to ON or OFF, and flow control, e.g., configuring the consumption processing rate of inbound request dispatcher 308 (such as a certain number of requests a minute), or both. Dispatch controller 307 may be automatically or manually operated. As can be seen in FIG. 3, dispatch controllers 313 and 315 are connected to response dispatcher 314 and response dispatcher 316, respectively, and can provide similar services as those discussed above.

In one example, flow control can be effected using a work manager (not shown) as hardware and/or software associated with a dispatch controller which limits the number of concurrent threads associated with the dispatch controller to a maximum number, in combination with a "wait" policy applied via, e.g., a Java callout to the calling request. Thus, in one embodiment, flow control is effected by limiting the number of requests dispatched from the request queue. For example, the number of requests dispatched from the request queue is limited in accordance with a number of previous requests already dispatched from the request queue. In another example, the number of requests dispatched from the request queue is limited for a predetermined amount of time after an unavailability of one or more nodes associated with the requests on the network.

Inbound request dispatcher 308 is hardware and/or software responsible for consuming and performing process request/messages. Inbound request dispatcher 308 can be in an ON or OFF state. In the ON state, message are consumed, processed and delivered to the relevant process components on the network (in, e.g., a business process execution language (BPEL) standard executable language for specifying actions within processes with web services). In the OFF state, message consumption is disabled. Inbound request dispatcher 308 may be associated with at least one manual dispatch controller 307 and zero or more automated dispatch controller(s) 307.

Service availability service 308-*a* is hardware and/or software for storing information regarding the availability of services on a network, detecting an unavailability of a node on the network, and determining one or more unavailable services based on the unavailability of the node. The one or more unavailable services includes any services performed by the unavailable node and any services performed by other nodes which depend on the unavailable node. Service availability service 308-*a* will be described more fully below with respect to FIG. 4 and FIG. 5.

Proxy service 309 is hardware and/or software for acting as a proxy for each service and the service availability service 308-*a*, and specifically to provide views to the service availability service 308-*a* of different processes and services, and to allow inbound request dispatcher 308 to invoke the services and/or associated processes (e.g., process 310).

Process 310 is hardware and/or software representing an existing process (e.g. a BPEL process) performed by one or more nodes on the network. Process 310 receives an alphanumeric client identification (ClientID), e.g. for client 301, and returns the ClientID on reply along with the process response. For example, the ClientID may be a new element added to existing message header values propagated across a BPEL process.

Outbound request interceptor 311 is hardware and/or software implementing a callback interface associated with the process response. Outbound request interceptor 311 invokes response policy service 317 by passing the ClientID, and receives from response policy service 317 a response queue destination (e.g., response queue 312*a* in response queue set 312). Outbound request interceptor 311 publishes the response to the destination response queue. As shown in FIG. 3, in some cases a response may immediately dispatched from outbound request interceptor 311 to callback service 318, bypassing the queue(s) (e.g., based on a policy configuration for that type of response).

Response queue set 312 is a hardware and/or software queue, e.g., a JMS queue or other queue resource providing persistence storage of the process response messages. Initially, a response queue set will be shared by all eligible processes. That is, a queue (e.g., response queue 312*a*) will contain response messages associated with all process types. For example, services such as wallet activation and setup of a service account would publish responses to the same queue. However, within response queue set 312, each client may have a dedicated (distributed) queue.

Response dispatchers 314 and 316 are hardware and/or software responsible for consuming and executing process response messages. Response dispatchers 314 and 316 are (or may be) in an ON or OFF state. In the ON state, messages are consumed, processed and delivered to client 301. In the OFF state, message consumption is disabled. A response dispatcher (e.g., response dispatcher 314) may enter an OFF state when, for example, the client 301 is unavailable due to a planned or unplanned outage, or interactions with the client 301 have been disabled for business reasons. Response Dispatchers 314 and 316 may be associated with at least one manual dispatch controller and zero or more automated dispatch controllers.

Response policy service 317 is hardware and/or software for providing a service interface and implementation for determining a response queue destination for a given ClientID. Given a request containing the process type and clientID, response policy service 317 returns the response queue destination (e.g., response queue 312*a* in response queue set 312). In one example, response policy service 317 may store policies in a table including, for each client ID, an expiration value (e.g., 30 minutes), and a queue status (e.g., ON or OFF). Thus, in some cases, a response message may expire from response queue set 312, although this may be handled as an out of channel response (e.g., using e-mail), based on the assumption is that client 301 is unreachable.

Callback service 318 is hardware and/or software for transmitting the response to client 301. In that regard, in the case that client 301 corresponds to a wallet client application (e.g., wallet client application 125-1) callback service 318 may be a proxy to a wallet server associated with the wallet client application.

Example scenarios of processing using the system shown in FIG. 3 will now be described.

(1) Full Availability

In a scenario in which the components in FIG. 3 are available (e.g., client 301 and required processes 310 are operating), client 301, acting as a service consumer, submits an asynchronous request to an inbound proxy service (not shown) associated with a specific process type. For example, client 301 may submit a request for a service or process "Activate Wallet" associated with wallet client application 125-1. A ClientID corresponding to client 301 is included in the request and/or message header, or both, or is added by the recipient of the request.

Inbound request interceptor 302 invokes the request policy service 303 using the process type and ClientID to obtain an expiration value.

Inbound request interceptor 302, in turn, modifies the request/message by adding the ClientID and expiration value as JMS headers, and routes the request/message to the request process queue 304.

Inbound request dispatcher 308 is configured for ON and, in turn, consumes the request/message. Inbound request dispatcher 308 extracts the ClientID, populates the message header, and transforms the request/message into the request defined by the corresponding process 310.

Process 310 receives and processes the request, and sends the response to outbound response interceptor 311. The response includes the ClientID.

Outbound response interceptor 311 uses the process type and clientID to invoke the response policy service 317 to obtain the specific client queue in the response queue set 312. Outbound response interceptor 311 transforms the request to a message and publishes it to the designated client queue (e.g., client queue 312a).

The response dispatcher associated with the client queue (e.g., response dispatcher 316), in turn, consumes the response message. Based on the response type, the response dispatcher routes the response to a response handler for the service type in callback service 318, which returns the response to the client 301.

(2) Process Unavailable

In this scenario, one or more processes 310 are unavailable, due to, for example, a planned or unplanned outage or to the unavailability of a service on which the process depends. Determinations regarding unavailability of a service are made by service availability service 308-a, and are described more fully below with respect to FIG. 4 and FIG. 5.

In this scenario, client 301, acting as a service consumer, submits an asynchronous request to an inbound proxy service (not shown) associated with a specific process type. For example, client 301 may submit a request for a process or service "Activate Wallet" associated with wallet client application 125-1. A ClientID corresponding to client 301 is included in the request and/or message header, or both, or is added by the recipient of the request.

Inbound request interceptor 302 invokes the request policy service 303 using the process type and ClientID to obtain an expiration value.

Inbound request interceptor 302 modifies the request/message by adding the ClientID and expiration value as JMS headers, and routes the request/message to the request process queue 304.

In this scenario, inbound request dispatcher 308 is configured for OFF due to the unavailability of one or more processes 310 as determined by service availability service 308-a, and the request/message remains on the request process queue 304.

If inbound request dispatcher 308 transitions to ON (due to the service becoming available), the process proceeds as in the full availability scenario discussed above. Thus, inbound request dispatcher 308, in turn, consumes the request/message. Inbound request dispatcher 308 extracts the ClientID, populates the message header, and transforms the request/message into the request defined by the corresponding process 310. Process 310 receives the request, processes and sends the response to outbound response interceptor 311. The response includes the ClientID. Outbound response interceptor 311 uses the process type and clientID to invoke the response policy service 317 to obtain the specific client queue in the response queue set 312. Outbound response interceptor 311, in turn, transforms the request to a message and publishes to the designated client queue (e.g., client queue 312a). The response dispatcher associated with the client queue (e.g., response dispatcher 316) consumes the response message. Based on the response type, the response dispatcher routes the response to a response handler for the service type in callback service 318, which returns the response to the client 301.

On the other hand, if the message expires without being processed, based on the expiration defined in request policy service 303, the message is moved to request expire queue 305. Expire dispatcher 306, in turn, consumes the request/message, and creates a valid service response for the expire condition. Using the ClientID, expire dispatcher 306 publishes the service response message to the client's queue in response queue set 312. The service response message will be processed based on the operational status of the response dispatcher (e.g., response dispatcher 314) associated with the client's queue.

(3) Client Unavailable

In this example embodiment, a client 301 is not available for receiving response callbacks. This could be due to a planned or unplanned outage on the client 301.

This scenario begins with the completion of the queuing of the response message to the client's queue within the response queue set 312. This can occur in both the Full Availability scenario or Process Unavailable scenario described above.

The response dispatcher associated with the client's queue (e.g., response dispatcher 316) is set to the OFF state, in response to the unavailability of the client 301. The response message remains in the queue in response queue set 312 while response dispatcher 316 is OFF.

If response dispatcher 316 transitions to the ON state, the message is consumed and delivery attempted to the client 301. That is, the message is delivered normally or, on failure, subject to the retry policy configured on the client queue (e.g. queue 312a). A typical retry policy can require several retries with eventual push of the message to a dead-letter destination. In one example, a delivery failure may abort the normal retry policy behavior and transition the response dispatcher 316 to the OFF state.

(4) Unavailable to Available

In this example embodiment, either a Process Unavailable scenario or Client Unavailable scenario involves a transition from unavailable to available.

This scenario begins with the initiation of message processing by either the inbound request dispatcher 308 or the response dispatcher associated with the client's queue (e.g., response dispatcher 316). In this scenario, a message processing rate is limited by the dispatch controller associated with the dispatcher (e.g., dispatch controller 307 associated with inbound request dispatcher 308, dispatch controller 315 associated with response dispatcher 316), as discussed above. The dispatch controllers provide flow rate policy enforcement to prevent message receiving systems from being saturated.

Figure 4:
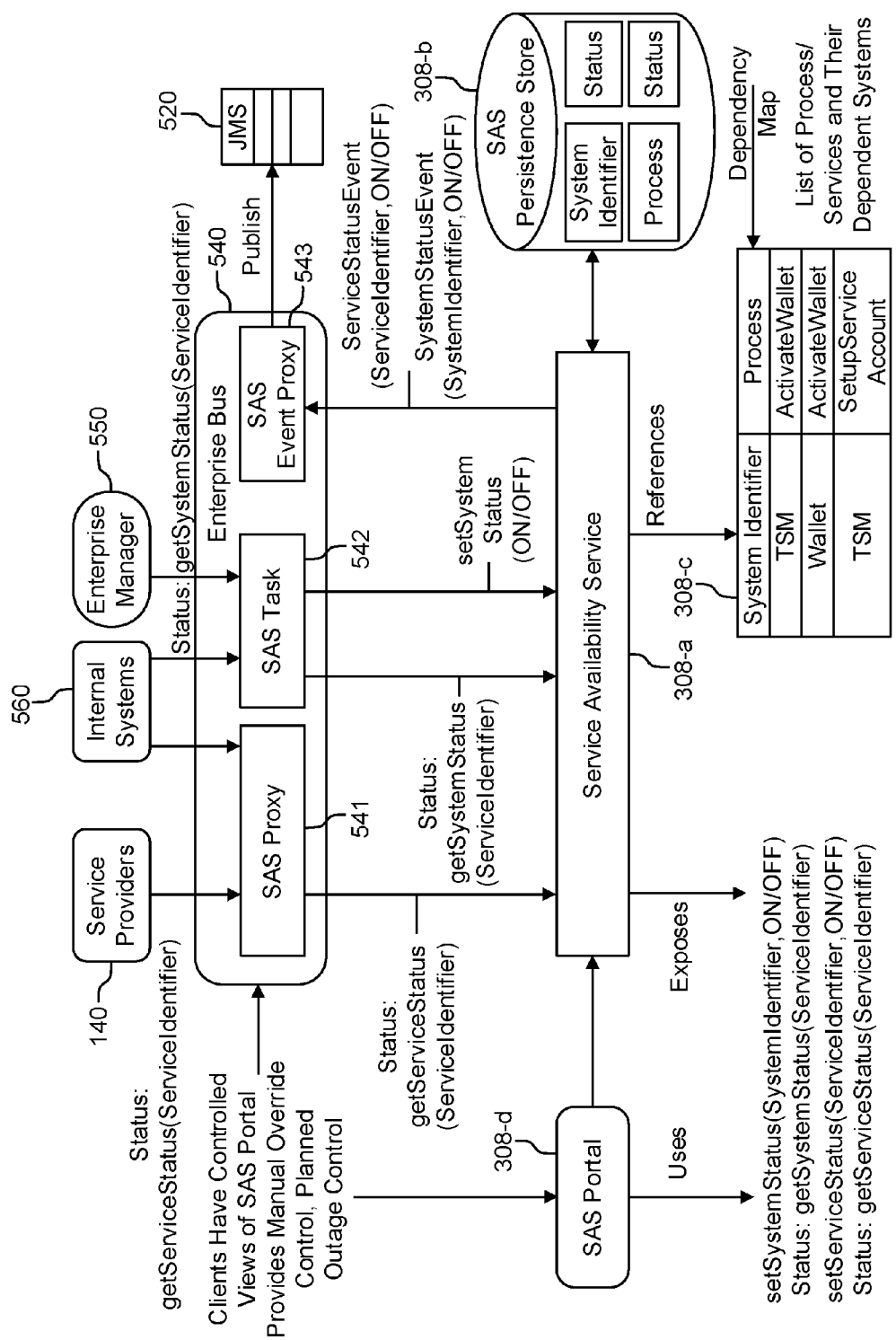
FIG. 4 is a diagram illustrating operation of a service availability service according to an example embodiment.

FIG. 4 is a diagram illustrating the operation of service availability service 308-a according to an example embodiment. In one embodiment, service availability service 308-a is implemented in ESB 135 shown in FIG. 1.

As mentioned above, service availability service 308-a may be hardware and/or software for, among other things, storing information regarding the availability of services on a network, detecting an unavailability of a node on the network, and determining one or more unavailable services based on the unavailability of the node. The one or more unavailable services may include any services performed by the unavailable node and any services performed by other nodes which depend on the unavailable node. The stored information is updated to reflect the one or more unavailable services.

In more detail, service availability service 308-a is responsible for maintaining the state, e.g., operational status of systems and elements in system 100 (including those in framework 300) and processes. Service availability service 308-a provides an interface for updating the operational status of services and/or processes, and monitoring agents at other elements on system 100 may use this interface. In response to a system update, planned or unplanned outage, or other change in unavailability of services, service availability service 308-a is responsible for determining which process(es) would be impacted or which client systems are impacted.

Service availability service 308-a, in turn, publishes notifications to controller notification agents (not shown) that indicate a change of operation status of a process or client system. A controller notification agent is hardware and/or software responsible for receiving and monitoring system and/or process state change events published by service availability service 308-a. In response to the event, the controller notification agents are responsible for updating the state of one or more dispatch controllers (e.g., dispatch controller 307) to ON or OFF. Thus, a controller notification agent can be a sub-component and/or related component of a dispatch controller.

Service availability service 308-a updates a service availability service persistence store 308-b (SAS persistence store 308-b) to maintain operation status state associated with systems, dependent process(es) and client systems. Thus, in one aspect, SAS persistence store 308-b comprises stored information regarding the availability of services on a network. In one embodiment, service availability service 308-a may provide the information in SAS persistence store 308-b directly in response to a request from a wallet client application.

Dependency map 308-c is hardware and/or software, such as a database, storing a list of processes and/or services and their dependent systems. Dependency map 308-c is referenced by service availability service 308-a to determine which processes and/or services are affected by the unavailability of a node/system on the network (e.g., a trusted service manager (TSM) system), and which processes or services are affected by the unavailability of those systems affected by the first outage. Put another way, the dependency map 308-c allows service availability service 308-a to see how systems, processes and services are interconnected, so that an outage or unavailability at one node can appropriately be propagated also to those nodes which depend on the unavailable node (and thus are also unavailable themselves). Thus, using dependency map 308-c, service availability service 308-a can determine one or more unavailable services or any services performed by an unavailable node, and any services performed by other nodes which depend on the unavailable node. Accordingly, dependency map 308-c comprises dependency rules which service availability service 308-a can apply to determine which services are performed by other nodes which depend on the unavailable node.

Dependency map 308-c may also be used to determine if the service can be performed by other nodes. In particular, more than one node may provide the requested service or process. Thus, for such services or processes, a failure or unavailability at one node may not prove fatal to the execution of the service or process. Accordingly, in one embodiment, the dependency rules in dependency map 308-c can be applied by service availability service 308-a to determine if one or more processes comprising a service can be performed by other nodes on the network. In such an embodiment, i.e., in the case that other nodes on the network can perform the services of the unavailable node, service availability service 308-a changes the information in SAS Persistence Store 308-b to reflect this.

Service availability service portal (SAS portal) 308-d provides an interface to service providers 140, internal systems 560, and enterprise manager 550 via enterprise bus 540. For example, SAS portal 308-d provides a query interface to allow system components, service providers, clients and the like the capability to obtain the operational status of process(es). In that regard, each of these parties/elements are provided with controlled views of SAS portal 308-d, which provides manual override control, planned outage control, and the like. For example, service provider 140-1 may use SAS portal 308-d to notify service availability service 308-a of an upcoming planned outage with an associated service. SAS portal 308-d may use functions such as setSystemStatus(SystemIdentifier, ON/OFF) to set the status of an associated service with the Service Identifier to ON or OFF in accordance with such information, or may retrieve service statuses for service providers 140, internal systems 560, and enterprise manager 550 with a function getServiceStatus(Service Identifier).

As discussed above, dispatch controllers (e.g., dispatch controller 307) maintain an operational state, e.g., ON or OFF on a message dispatcher (e.g. inbound request dispatcher 308). In that regard, dispatch controllers may be implemented using either a "Pull" mode or a "Push" mode. In Pull mode, the request is consumed and the dispatch controller queries the status of a process or client system to determine its operational status. If unavailable, the corresponding request is queued. Pull mode requires that service availability service 308-a be operational. In Push mode, the dispatch controller is configured via a controller notification agent to a state of ON or OFF. In the OFF state, messages from the queue are not consumed.

As also mentioned above with respect to FIG. 1, service providers 140 are systems, platforms, computer architectures or the like, managed by a partner and/or merchant (e.g., business, retailer, bank), which provide services to mobile devices 120, such as services corresponding to loyalty programs and offers on wallet client applications on mobile devices 120. Referring back to FIG. 4, service providers 140 may request the status of a service (e.g. available, unavailable) by calling a function getServiceStatus (ServiceIdentifier) via service availability service proxy (SAS proxy) 541, for the service corresponding to the ServiceIdentifier.

Internal system 560 includes elements internal to the mobile commerce system other than the mobile devices and service providers, e.g., elements of the mobile wallet provider platform 130. Internal system 560 may determine the availability of one or more system(s) on the network associated with a service by calling the function "getSystemStatus(ServiceIdentifier)", which requests a status (e.g., availability) of a system associated with a ServiceIdentifier from service availability service 308-*a* through enterprise bus 540, and specifically through service availability task (SAS task) 542. Internal system 560 may also request the status of a service (e.g. available, unavailable) by calling a function getServiceStatus (ServiceIdentifier) via service availability service proxy (SAS proxy) 541, for the service corresponding to the ServiceIdentifier.

Enterprise manager 550 is hardware and/or software responsible for monitoring systems (partner, external provider, internal provider) within the service availability ecosystem shown in FIG. 4. To that end, enterprise manager 550 calls a function "getSystemStatus(ServiceIdentifier)", which requests a status (e.g., availability) of a system in the same manner as internal system 560. Enterprise manager 550 is also responsible for registering a system status event (e.g. online, offline) received from monitored systems with the service availability service 308-*a* using a "setSystemStatus" function.

Enterprise bus 540 is hardware and/or software which provides proxy service(s) with different views/features to service availability service 308-*a*. For example, enterprise bus 540 includes SAS proxy 541 for receiving and processing GetServiceStatus requests, SAS task 542 for receiving and processing GetSystemStatus requests, and service availability service event proxy (SAS event proxy) 543 for receiving and publishing responses to the above requests from service availability service 308-*a*. For example, SAS event proxy 543 may publish the responses to JMS queue 520. SAS task 542 may also be used to set the status of a system to ON or OFF using the setSystemStatus function called by, for example, enterprise manager 550. Enterprise bus 540 also acts as a hosting target for a "health check" utility for certain services, as described more fully below with respect to FIG. 5.

Figure 5:
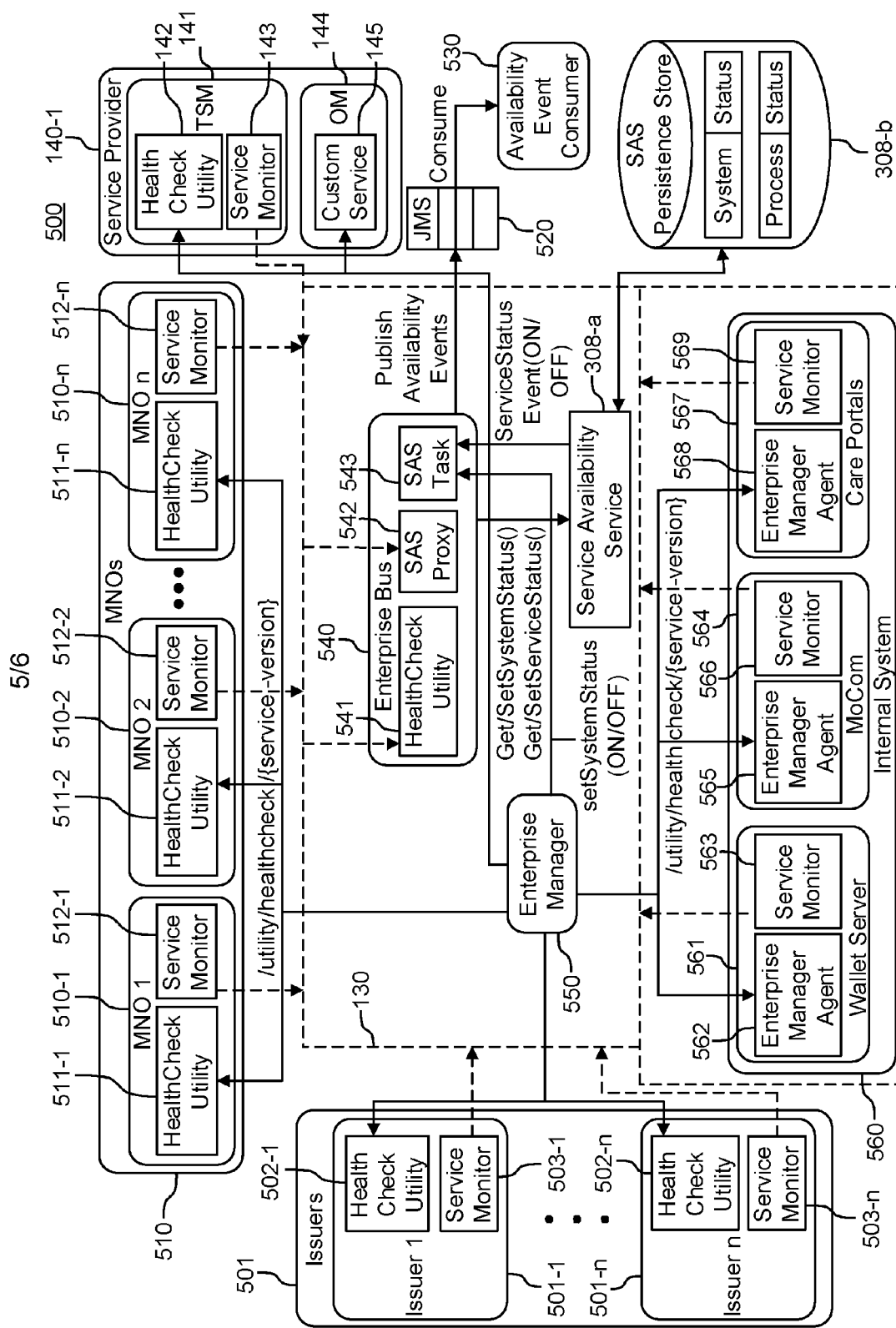
FIG. 5 is a diagram illustrating an example architecture for queuing and responding to service requests in accordance with service availability according to an example embodiment.

FIG. 5 is a diagram illustrating an example architecture for queuing and responding to service requests in accordance with service availability according to an example embodiment.

As shown in FIG. 5, mobile wallet provider platform 130 includes service availability service 308-*a*, enterprise manager 550, enterprise bus 540 (including SAS proxy 541, also referred to here as "HealthCheck Utility", SAS task 542 and SAS event proxy 543), and internal system 560. SAS persistence store 308-*b* is shown in FIG. 5 as external to mobile wallet provider platform 130, but in other embodiments could also be internal to mobile wallet provider platform 130. For purposes of conciseness, aspects of these elements which have already been discussed above will not be repeated here. In that regard, in one embodiment, these elements of FIG. 5, other than internal system 560, may be located specifically within ESB 135.

Issuers 501-1, 501-2, . . . , 501-*n* (hereafter referred to as "issuers 501") include account-issuing entities such as merchants, card associations, banks, marketing companies, and transit authorities. These accounts may be tied and/or associated to applications on mobile devices 120, such as wallet client applications 125.

Mobile network operators 510-1, 510-2, . . . , 510-*n* (hereafter referred to as "MNOs 510") use mobile networks such as mobile phone cellular networks, radio networks, or the like (e.g., those within communication network 150 in FIG. 1) to provide wireless communications services to mobile devices (e.g. mobile devices 120 in FIG. 1). Each MNO may control the access and restriction of data across a mobile network.

TSM 141 is a hardware/software system that may serve MNOs and account-issuing service providers by provisioning applets, such as contactless applets associated with the service providers, to mobile devices. Operations Manager (OM) 144 is an external service provider comprising a hardware/software system for provisioning custom services, such as custom service 145, to clients on the network.

FIG. 5 also depicts additional aspects of internal system 560. In particular, wallet server 561 manages communications with the wallet client applications 125, tracks the state of the wallet client applications 125 (e.g., by storing states of the wallet client applications 125 in a wallet database), and provides interfaces for communication with other computer systems. Mobile commerce platform (MoCom) 564 is a hardware and/or software system responsible for the management of consumer data, including loyalty accounts and offers. In addition, MoCom 564 serves as a campaign manager for offers, providing a remote data store for offers made available to the consumer via the available merchant portals within wallet client applications 125. CARE portals 567 is a hardware and/or software system which manages information associated with wallet client applications 125, such as wallet event history, consumer profiles, and the like.

FIG. 5 also depicts various instances of "HealthCheck Utility" (hereafter referred to as "health check utility") and "Service Monitor" (hereafter referred to as "service monitor"). Specifically, issuer 501-1 includes health check utility 502-1 and service monitor 503-1, issuer 501-*n* includes health check utility 502-*n* and service monitor 503-*n*, mobile network operator (MNO) 510-1 includes health check utility 511-1 and service monitor 512-1, MNO 510-2 includes health check utility 511-2 and service monitor 512-2, MNO 510-*n* includes health check utility 511-*n* and service monitor 512-n, TSM 141 includes includes health check utility 142 and service monitor 143, wallet server 561 includes service monitor 563, mobile commerce platform (MoCom) 564 includes service monitor 566, and customer care portal (CARE portal) 567 includes service monitor 569.

In this regard, each health check utility corresponds to a service which provides a lightweight 'monitor point' for systems, e.g., service provider 140-1, issuers 501, and other systems or entities not directly monitored by enterprise manager 550. In particular, each health check utility may expose information about the overall availability of the corresponding system, e.g., returning an "available" or "unavailable" state indication (or ON or OFF). In one example embodiment, each health check utility may be implemented as a "ping" utility which, for example, sends a packet to a target and then waits for a response. Since this information is relatively small, the burden on each system is lightweight. As shown in FIG. 5, each health check utility exposes this information to other elements of the system via mobile wallet provider platform 130, and specifically via ESB 135. In addition, since wallet server 561, MoCom 564 and CARE portal 567 are monitored by the enterprise manager 550, these elements include, respectively, enterprise manager agent 562, enterprise manager agent 565 and enterprise manager agent 569 for communicating information similar to that provided by the respective health check utility to enterprise manager 550.

Each service monitor, on the other hand, provides more specific availability information. In particular, each service monitor exposes information on specific processes and/or services, e.g., their current and planned availability or unavailability, their current capacity and/or load, estimated wait time, and the like. Thus, the service monitor is more detailed than the health check utility. As such, determinations of availability can be made more fine-grained. For example, as mentioned above, a node may be deemed unavailable even though the node is in an ON state, e.g., when it does not have the capacity to handle one or more incoming request(s) because it is over a capacity limit.

As shown in FIG. 5, each service monitor exposes this information to other elements of the system via mobile wallet provider platform 130, and specifically via ESB 135. In one example embodiment, the unavailability of the node is planned according to a schedule, and, using the information from each service monitor, service availability service 308-a is able to determine, for example, an estimated wait time for availability of the one or more unavailable services based on the schedule.

Availability events gathered by service availability service 380-a (e.g., statuses of systems or processes which are unavailable) according to the above can be published to a queue, e.g., JMS queue 520. In this example embodiment, the information regarding availability of services is published to a queue for consumption by other nodes on the network. An availability event consumer 530 may, in turn, consume the availability event information from the queue. In one example embodiment, availability event consumer 530 might correspond to inbound request dispatcher 308 in FIG. 3.

Example Computer-Readable Medium Implementations

The example embodiments described above such as, for example, the systems and procedures depicted in or discussed in connection with FIGS. 1-5 or any part or function thereof, may be implemented by using hardware, software or a combination of the two. The implementation may be in one or more computers or other processing systems. While manipulations performed by these example embodiments may have been referred to in terms commonly associated with mental operations performed by a human operator, no human operator is needed to perform any of the operations described herein. In other words, the operations may be completely implemented with machine operations. Useful machines for performing the operation of the example embodiments presented herein include general purpose digital computers or similar devices.

Figure 6:
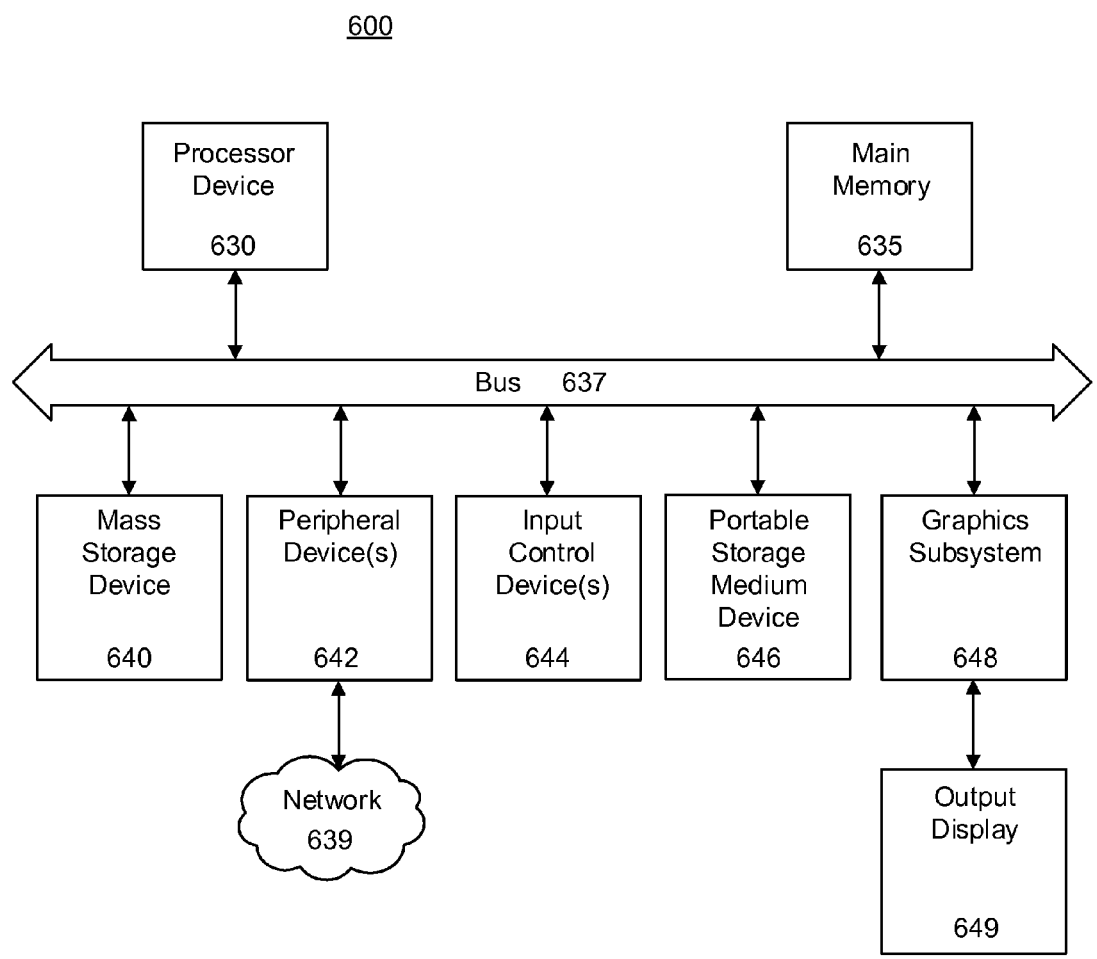
FIG. 6 is a block diagram of a general or special purpose computer.

FIG. 6 is a block diagram of a general and/or special purpose computer 600, which may be a general and/or special purpose computing device, in accordance with some of the example embodiments of the invention. The computer 600 may be, for example, a user device, a user computer, a client computer and/or a server computer, among other things.

The computer 600 may include without limitation a processor device 630, a main memory 635, and an interconnect bus 637. The processor device 630 may include without limitation a single microprocessor, or may include a plurality of microprocessors for configuring the computer 600 as a multi-processor system. The main memory 635 stores, among other things, instructions and/or data for execution by the processor device 630. The main memory 635 may include banks of dynamic random access memory (DRAM), as well as cache memory.

The computer 600 may further include a mass storage device 640, peripheral device(s) 642, portable non-transitory storage medium device(s) 646, input control device(s) 644, a graphics subsystem 648, and/or an output display interface 649. For explanatory purposes, all components in the computer 600 are shown in FIG. 6 as being coupled via the bus 637. However, the computer 600 is not so limited. Devices of the computer 600 may be coupled via one or more data transport means. For example, the processor device 630 and/or the main memory 635 may be coupled via a local microprocessor bus. The mass storage device 640, peripheral device(s) 642, portable storage medium device(s) 646, and/or graphics subsystem 648 may be coupled via one or more input/output (I/O) buses. The mass storage device 640 may be a nonvolatile storage device for storing data and/or instructions for use by the processor device 630. The mass storage device 640 may be implemented, for example, with a magnetic disk drive or an optical disk drive. In a software embodiment, the mass storage device 640 is configured for loading contents of the mass storage device 640 into the main memory 635.

The portable storage medium device 646 operates in conjunction with a nonvolatile portable storage medium, such as, for example, a compact disc read only memory (CD-ROM), to input and output data and code to and from the computer 600. In some embodiments, the software for storing information may be stored on a portable storage medium, and may be inputted into the computer 600 via the portable storage medium device 646. The peripheral device(s) 642 may include any type of computer support device, such as, for example, an input/output (I/O) interface configured to add additional functionality to the computer 600. For example, the peripheral device(s) 642 may include a network interface card for interfacing the computer 600 with a network.

The input control device(s) 644 provide a portion of the user interface for a user of the computer 600. The input control device(s) 644 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the computer 600 may include the graphics subsystem 648 and the output display 649. The output display 649 may include a cathode ray tube (CRT) display and/or a liquid crystal display (LCD). The graphics subsystem 648 receives textual and graphical information, and processes the information for output to the output display 649.

Each component of the computer 600 may represent a broad category of a computer component of a general and/or special purpose computer. Components of the computer 600 are not limited to the specific implementations provided here.

Software embodiments of the example embodiments presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine- or computer-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further include software for performing example aspects of the invention, as described above.

Included in the programming and/or software of the general and/or special purpose computer or microprocessor are software modules for implementing the procedures described above.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above-described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A system to manage requests for network nodes that are not available to perform a type of process, comprising:
   at least one memory operable to store request and response queues; and
   a processor coupled to the memory, the processor being operable to:
      receive a request to execute a process;
      store the request in a request queue among a set of request queues, wherein the request queue corresponds to a type of process corresponding to the request;
      determine that one or more nodes on a network are not available to perform the process;
      set an expiration value for the request based on the type of the process in response to determining that the one or more nodes on the network are not available to perform the process, wherein the expiration value indicates how long requests of the type of the process are to be queued following the determination that the one or more nodes operable to perform the type of the process are not available;
      dispatch the request from the request queue to the one or more nodes on the network to perform the process at a predetermined timing earlier than a time associated with the expiration value, if the one or more nodes on the network become available to perform the process before the time associated with the expiration value; and
      dispatch the request from the request queue to a request expire queue if the one or more nodes on the network continue to remain not available to perform the process at or after the time associated with the expiration value.

2. The system according to claim 1, wherein the processor is operable to limit the number of requests dispatched from the request queue.

3. The system according to claim 2, wherein the number of requests dispatched from the request queue is limited in accordance with a number of previous requests dispatched from the request queue within a predetermined amount of time.

4. The system according to claim 1, further comprising an interface operable to receive the expiration value from a mobile device.

5. The system according to claim 1, wherein respective expiration values are associated with mobile devices.

6. The system according to claim 1, wherein the determination of whether one or more nodes on a network are available to perform the process is performed by communicating with a service availability service.

7. A method to manage process requests, comprising:
storing, by one or more computing devices, request and response queues;
receiving, by one or more computing devices, a request to execute a process;
storing, by one or more computing devices, the request in a request queue among a set of request queues, wherein the request queue corresponds to the process;
determining, by one or more computing devices, that one or more nodes on a network are not available to perform the process;
setting, by one or more computing devices, an expiration value for the request based on a type of the process in response to determining that the one or more nodes on the network are not available to perform the process, wherein the expiration value indicates how long requests of the type of the process are to be queued following the determination that the one or more nodes operable to perform the type of the process is not available;
dispatching, by one or more computing devices, the request from the request queue to the one or more nodes on the network to perform the process at a predetermined timing earlier than a time associated with the expiration value, if the one or more nodes on the network becomes available to perform the process before the time associated with the expiration value; and
dispatching, by one or more computing devices, the request queue to a request expire queue if the one or more nodes on the network continue to remain not available to perform the process at or after the time associated with the expiration value.

8. The method according to claim 7, further comprising limiting, by the one or more computing devices, the number of requests dispatched from the request queue.

9. The method according to claim 8, wherein the number of requests dispatched from the request queue is limited in accordance with a number of previous requests dispatched from the request queue within a predetermined amount of time.

10. The method according to claim 7, further comprising receiving, by the one or more computing devices, the expiration value from a mobile device.

11. The method according to claim 7, wherein respective expiration values are associated with mobile devices.

12. The method according to claim 7, wherein the determination of whether one or more nodes on a network are available to perform the process is performed by communicating with a service availability service.

13. A non-transitory computer readable storage medium having stored thereon instructions that, when executed by a system including at least one processor and at least one memory, cause the system to:
store request and response queues;
receive a request to execute a process;
store the request in a request queue among a set of request queues, wherein the request queue corresponds to the process;
determine that one or more nodes on a network are not available to perform the process;
set an expiration value for the request based on a type of the process in response to determining that the one or more nodes on the network are not available to perform the process, wherein the expiration value indicates how long requests of the type of the process are to be queued following the determination that the one or more nodes operable to perform the type of the process is not available;
dispatch the request from the request queue to the one or more nodes on the network to perform the process at a predetermined timing earlier than a time associated with the expiration value, in a case that the one or more nodes on the network become available to perform the process before the time associated with the expiration value; and
dispatch the response from the request queue to a request expire queue if the one or more nodes on the network continue to remain unavailable to perform the process at or after the time associated with the expiration value.

14. The storage medium according to claim 13, wherein the instructions further cause the system to limit the number of requests dispatched from the request queue.

15. The storage medium according to claim 14, wherein the number of requests dispatched from the request queue is limited in accordance with a number of previous requests dispatched from the request queue within a predetermined amount of time.

16. The storage medium according to claim 13, wherein the instructions further cause the system to receive the expiration value from a mobile device.

17. The storage medium according to claim 13, wherein respective expiration values are associated with mobile devices.

* * * * *